(12) United States Patent
Chen

(10) Patent No.: US 8,290,062 B1
(45) Date of Patent: Oct. 16, 2012

(54) METHOD AND APPARATUS FOR MANIPULATING MPEG VIDEO

(75) Inventor: Inching Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 3431 days.

(21) Appl. No.: 09/671,957

(22) Filed: Sep. 27, 2000

(51) Int. Cl.
*H04N 7/18* (2006.01)

(52) U.S. Cl. .......... 375/240.25; 375/240.09; 375/240.08

(58) Field of Classification Search ............... 348/385.1, 348/387.1–388.1, 390.1; 375/240.01–240.29; 725/86, 90, 95, 105, 115, 135; 382/282
See application file for complete search history.

(56) References Cited

U.S. PATENT DOCUMENTS

| | | | | |
|---|---|---|---|---|
| 5,557,332 A | * | 9/1996 | Koyanagi et al. | 375/240.16 |
| 5,767,797 A | * | 6/1998 | Yogeshwar et al. | 341/50 |
| 5,896,176 A | * | 4/1999 | Das et al. | 375/240.15 |
| 6,141,453 A | * | 10/2000 | Banham et al. | 382/240 |
| 6,314,452 B1 | * | 11/2001 | Dekel et al. | 709/203 |
| 6,496,607 B1 | * | 12/2002 | Krishnamurthy et al. | 382/282 |
| 6,507,618 B1 | * | 1/2003 | Wee et al. | 375/240.16 |
| 6,553,150 B1 | * | 4/2003 | Wee et al. | 382/243 |
| 6,560,285 B1 | * | 5/2003 | Reitmeier et al. | 375/240.16 |
| 6,573,907 B1 | * | 6/2003 | Madrane | 715/719 |
| 6,577,679 B1 | * | 6/2003 | Apostolopoulos | 375/240.12 |
| 6,683,987 B1 | * | 1/2004 | Sugahara | 382/235 |

OTHER PUBLICATIONS

Rudrajit Samanta, Jiannan Zheng, Thomas Funkhouser, Kai Li, and Jaswinder Pal Singh, "Load Balancing for Multi-Projector Rendering Systems", SIGGRAPH/Eurographics Workshop on Graphics Hardware, Aug. 1999.

ISO/IEC 13818-2, "Generic Coding of Moving Pictures and Associated Audio Information: Video", Draft International Standard, Nov. 1994.

Angelo Biles, Jason Fritts, and Jaswinder Pal Singh, "Real-Time Parallel MPEG-2 Decoding in Software", 11th International Parallel Processing Symposium, Apr. 1997.

* cited by examiner

*Primary Examiner* — Andy Rao

(74) *Attorney, Agent, or Firm* — Trop, Pruner & Hu, P.C.

(57) ABSTRACT

A computer implemented method of manipulating and displaying an MPEG stream is described. In one embodiment of the invention, a computer implemented method comprises defining a spatial location across a series of pictures of an MPEG stream; and for each picture of the series of pictures in the MPEG stream, partially decoding the picture to determine an area of the picture falling within the spatial location.

13 Claims, 11 Drawing Sheets

METHOD AND APPARATUS FOR MANIPULATING MPEG VIDEO

BACKGROUND OF THE INVENTION

1. Field of the Invention

This invention relates to the field of MPEG video, more specifically to a method and apparatus for manipulating and displaying MPEG video.

2. Background Information

FIG. 1 (Prior Art) is a diagram of the structure an MPEG video stream. An MPEG video is an ordered stream of bits with special bit patterns marking the beginning of a section. A section corresponds to MPEG's layered structure. The layers, or levels, are sequence 101, groups of pictures (GOPs) 102, individual pictures 103, slices 105, macroblocks (MBs) 107, and blocks 109 as shown in FIG. 1 (Overview of MPEG, Berkley Multimedia Research). Of course, the lowest layer is the pixel layer.

In MPEG video, the layers are structured in the following manner: a sequence 101 is composed of GOPs 102; a GOP 102 is composed of pictures 103; a picture 103 is divided into slices 105; a slice 105 is composed of MBs 107; and MBs 107 are composed of blocks 109 (Overview of MPEG, Berkley Multimedia Research). Each picture 103 is normally encoded into one of three types of pictures, an intra coded picture (I-picture) 110, a predictive coded picture (P-picture) 112, and a bi-directionally predictive coded picture (B-picture) 114. The I-picture 110 can be decoded independently because it uses only spatial correlation within the picture. P/B-pictures 112,114 take advantage of temporal correlation to achieve a higher degree of compression by only coding the differential data. As a result, neither P nor B pictures 112,114 can be independently decoded (Overview of MPEG, Berkley Multimedia Research).

Similar to pictures, there are three types of macroblocks 107: I macroblocks (I-MB), P macroblocks (P-MB), and B macroblocks (B-MB). An I-picture 110 is coded using I-MBs only. While all three types of macroblocks 107 are used to code a B-picture 114, only I-MB and P-MB are used in coding a P-picture 112 (Overview of MPEG, Berkley Multimedia Research).

MPEG video has been widely used in various standards, such as DTV, DVD, and DVB. Although MPEG video decoding is currently done mostly in hardware for real-time performance, conventional hardware for MPEG video decoding is limited to the resolution of HDTV and is not capable of decoding ultra high-resolution MPEG video for a display wall.

For example, the University of Minnesota uses high-end equipment for their Power Wall. Behind the Power Wall, two SGI Power Onyx2's using multiple InfiniteReality graphics engines are controlled by a computer with a Silicon Graphics Indy control processor. The Power Wall projects a 3200×2400 resolution display 8 feet wide and 6 feet tall from 4 rear-projection monitors.

An attempt to uses software for MPEG decoding is discussed in "Real-Time Parallel MPEG-2 Decoding in Software", Bilas, Fritts, and Singh, 11$^{th}$ Int'l Parallel Processing Symposium. Bilas et al discusses 2 software decoding approaches using a 16 processor Silicon Graphics Challenge multiprocessor (a fairly expensive multiprocessor) (Real-Time Parallel MPEG-2 Decoding in Software, Bilas, Fritts, and Singh, 11$^{th}$ Int'l Parallel Processing Symposium). First, Bilas et al uses a coarse approach by exploring the picture level. Second, Bilas et al uses a fine-grained approach at the slice level. In the first approach, Bilas et al assigns a GOP to a processor as a task. In the second approach, Bilas et al assigns a slice to a processor as a task.

Another software approach implemented at Princeton University employs multiple interconnected personal computers (PCs) which use commodity graphics adapters for low cost. In this method, a mismatch exists between what a PC decodes and what the PC is responsible for displaying. To illustrate, PC A would decode slices representing regions to be displayed by PCs A and B. PC B must wait until node A has decoded the slices. Once PC A completes decoding, then PC A transmits the decoded data to PC B for B to display its data. The other problem is load balancing, i.e., when many slices require decoding, but only a few are to be decoded by a PC. The load imbalance occurs when the number of slices cannot be evenly distributed to all participating PCs. For example, there are 68 slices in a HDTV resolution, 1920×1088. Two of the six PCs in group A get to decode 12 slices, each, whereas the remaining four PCs in group B decode a total of only 11 slices. As a result, not all PCs in group B are busy.

Currently, very little work exists for displaying MPEG video at the high resolution of a display wall. Hardware implementations and some software implementations require costly, specialized hardware. The software implementations using conventional PCs include problems such as load balancing and communication overhead between PCs.

DETAILED DESCRIPTION

In the following description, numerous specific details are set forth to provide a thorough understanding of the invention. However, it is understood that the invention may be practiced without these specific details. A method and apparatus for manipulating and displaying MPEG video is described.

Figure 1:
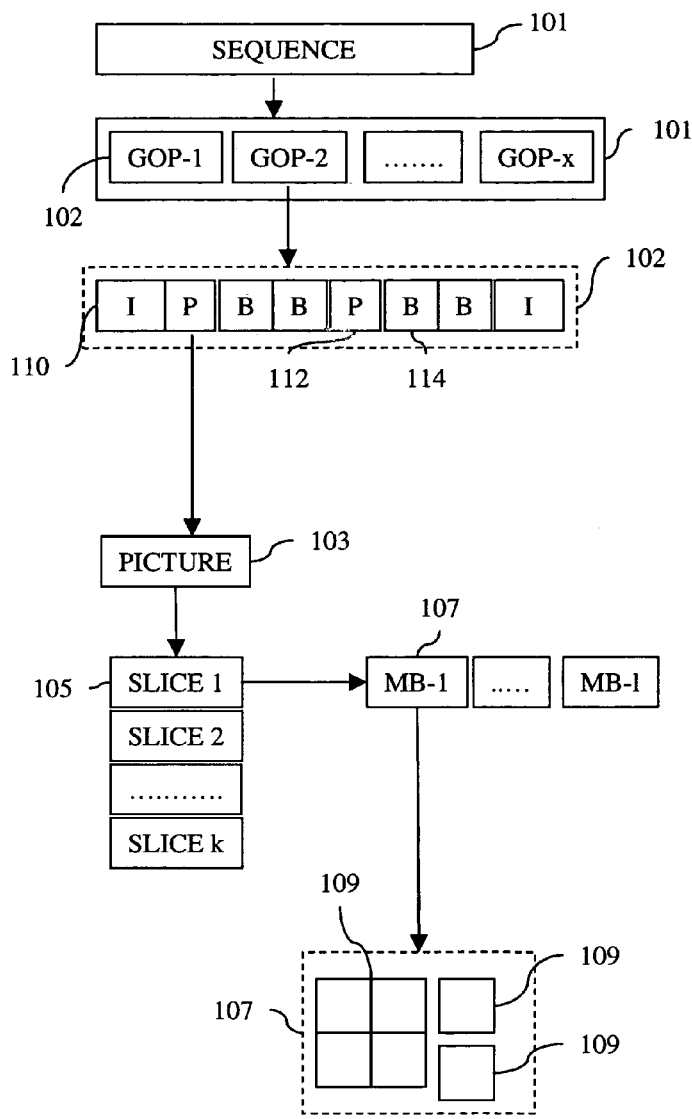
FIG. 1 (Prior Art) is a diagram of the structure an MPEG video stream.
Figure 2:
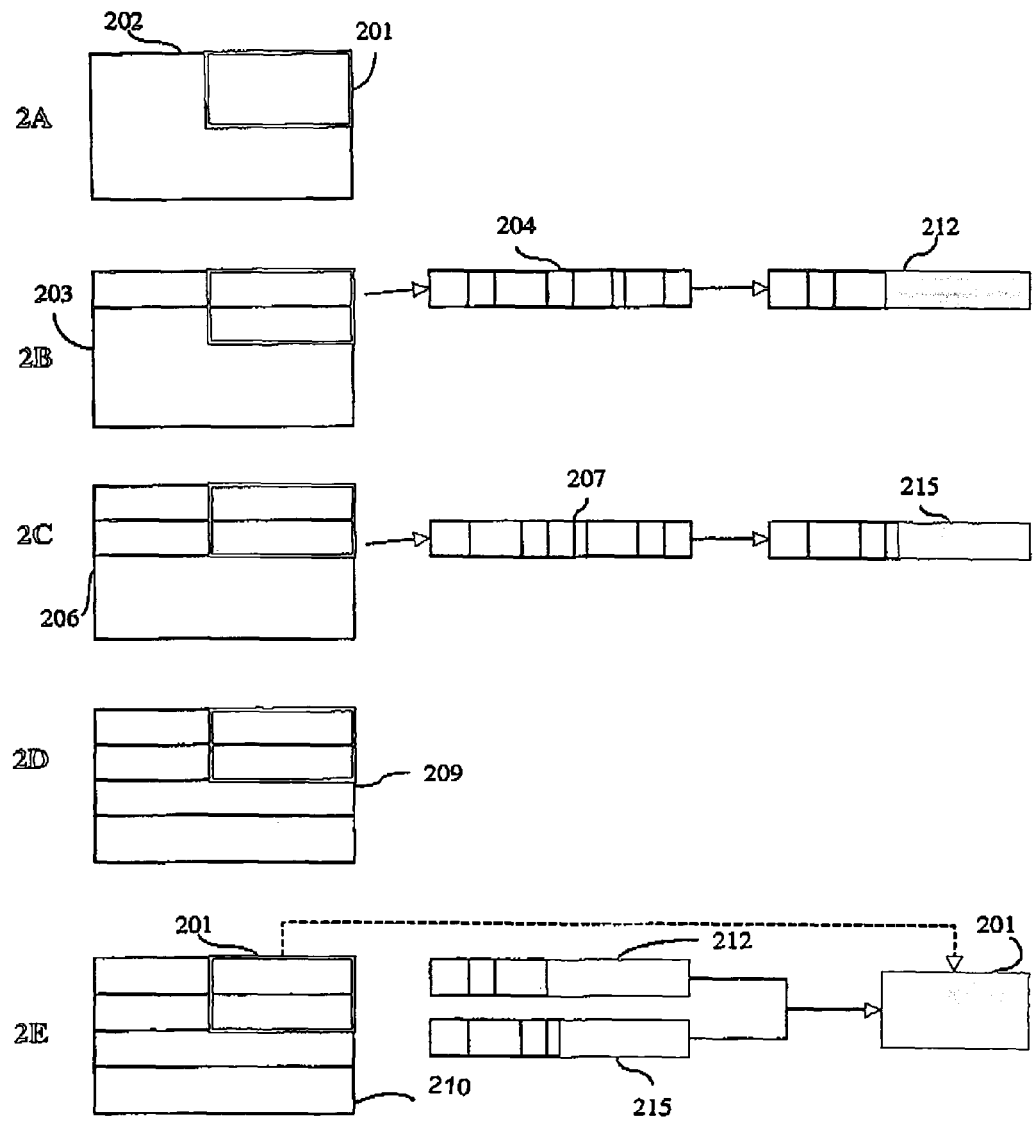
FIG. 2 is a diagram for partially decoding a picture to capture a region of interest (ROI).

FIG. 2 is a conceptual diagram for partially decoding a picture to capture a region of interest (ROI). The ROI is an area of a picture, smaller than the entire picture, which is to be treated separately by a given device (e.g., to be displayed by the device, to be reencoded by the device, etc.). In FIG. 2A, an ROI 201 of an MPEG encoded picture 202 is identified. In FIG. 2B, a first slice 203 partially falling within the ROI 201 of the MPEG encoded picture 202 is decoded into multiple macroblocks 204. A set 212 of the multiple macroblocks 204 for the part of the slice falling within the ROI 201 are further decoded. In FIG. 2C, a second slice 206 partially encompassed by the ROI is decoded into multiple macroblocks 207. In FIG. 2D, a third slice 209 of the picture 202 is not decoded because it does not fall within the region of interest 201. In FIG. 2E, a last slice 210 of the picture 202 also does not fall within the region of interest 201 and therefore is not further decoded. When combined, the set of macroblocks 212 and 215 in FIG. 2E form the ROI 201. The ROI is located by partially decoding a picture without fully decoding the entire picture, thus reducing computational complexity and increasing work efficiency. In addition, a system may only extract information relevant to its ROI, and not other ROI's.

Figure 3:
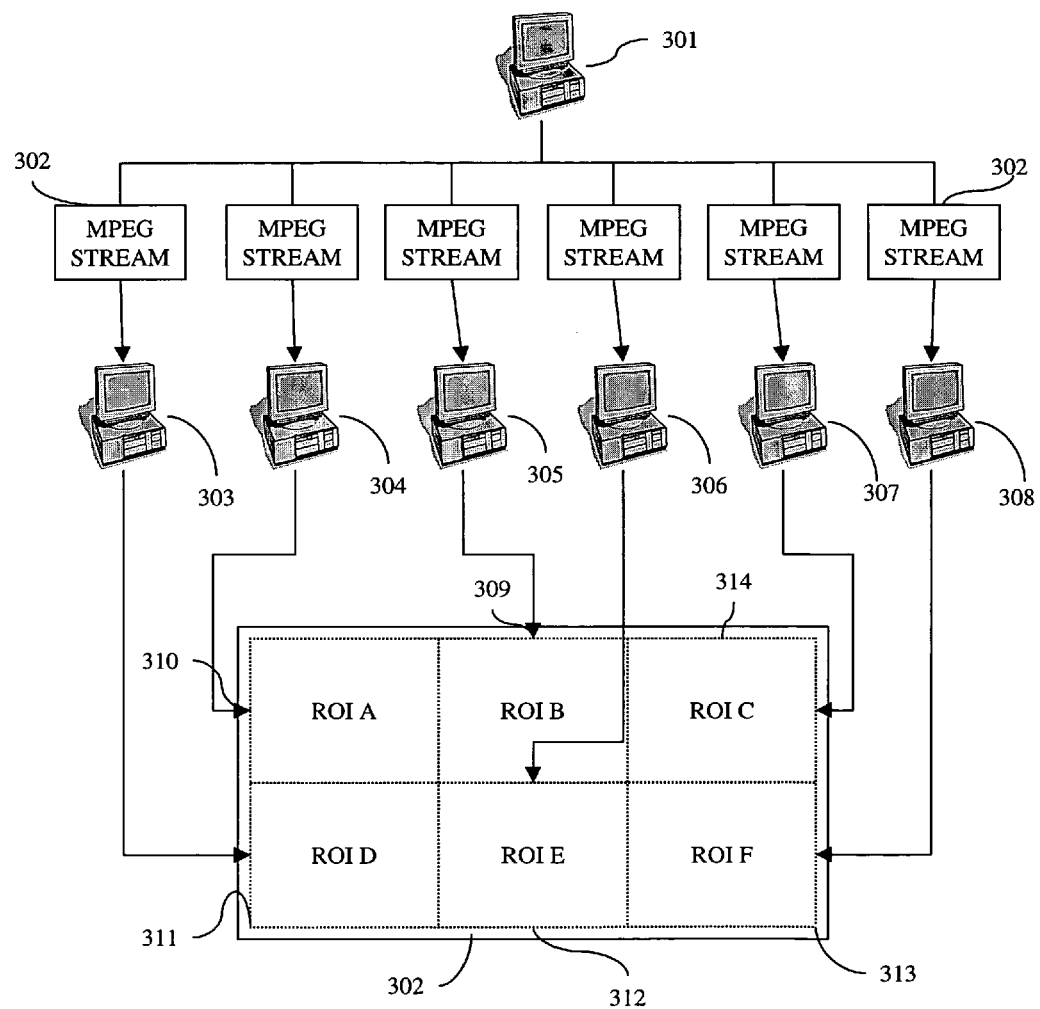
FIG. 3 is a conceptual diagram of the "push method" of manipulating MPEG video with Regions of Interest (ROI's), according to one embodiment of the invention.

FIG. 3 is a conceptual diagram of the "push method" of manipulating MPEG video with Regions of Interest (ROI's), according to one embodiment of the invention. In the "push method", a client computer 301 broadcasts an MPEG stream 302 over a network to node computers 303-308 connected to the network. The nodes 303-308 decode their ROI's 309-314 from the MPEG stream 302. The node computers 303-308 then display their ROI's 309-314 in synchronization. Continuous synchronized display of the ROI's 309-314 collectively display the MPEG video stream 302.

Figure 4:
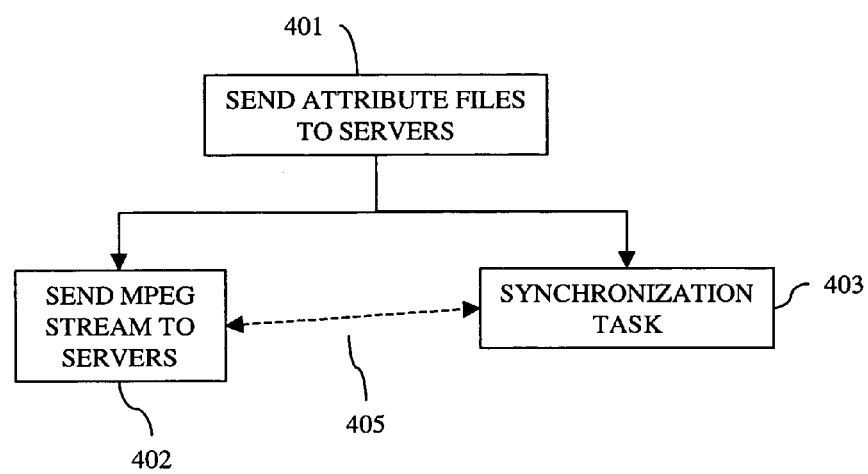
FIG. 4 is a flow chart of the client's tasks in the "push method" of manipulating MPEG video, according to one embodiment of the invention.

FIG. 4 is a flow chart of the client's tasks in the "push method" of manipulating MPEG video, according to one embodiment of the invention. At block 401, a client sends an attribute file to all nodes connected to the client over a network. After sending the attribute file, the client then begins to broadcast the MPEG stream to each of the node computers at block 402. At the same time, the client begins a synchronization task at block 403. The client's synchronization task at block 403 includes waiting for signals from the nodes on the network. A signal indicates that a node has decoded its ROI. When the client receives the signals from all desired nodes, the client sends a display command to the desired nodes. While the client broadcasts the MPEG stream over the network, it continuously performs the synchronization task. The dashed line 405 indicates the coordination between the synchronization task at block 403 and the computer sending MPEG streams at block 402. The client will not overload the node with MPEG data if the node does not have the capacity to handle any further MPEG data.

Figure 5:
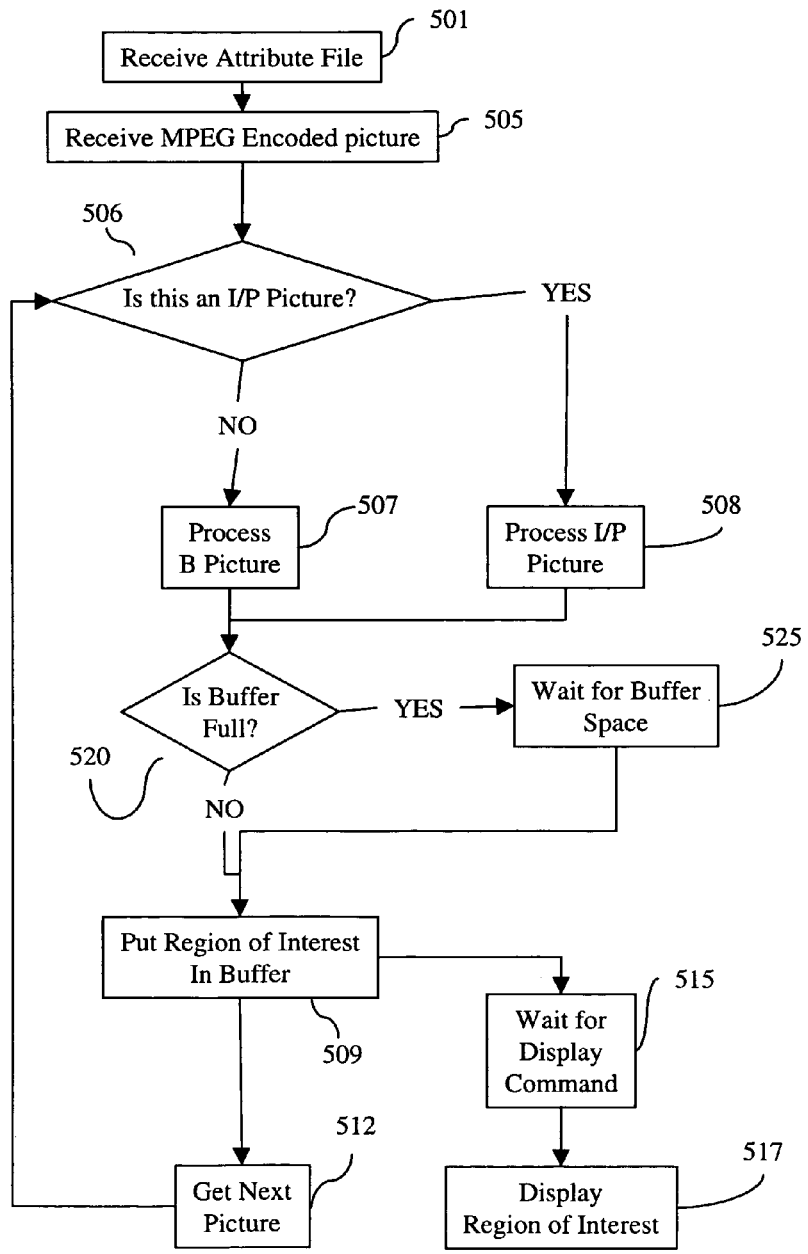
FIG. 5 is a flow chart of the node PC thread of the "push method" at the picture level according to one embodiment of the invention.

FIG. 5 is a flow chart of the node PC thread of the "push method" at the picture level according to one embodiment of the invention. At block 501, a node receives an attribute file. The node then begins to receive MPEG encoded pictures at block 505 from the client. The node then determines if the picture is an I/P picture or a B-picture at block 506. At block 508, the node processes I/P-pictures. At block 507, the node processes B-pictures. At block 520, the node determines if the buffer space is full. If the buffer space is full, then the node waits until space has been freed for the processed picture at block 525. If space is available or once space is made available, the node buffers a region of interest from the picture at block 509. At block 512, the node gets the next picture, while at the same time waiting for a display command from the client at block 515. Once the node receives the display command from the client at block 517 the node displays the ROI.

Figure 6:
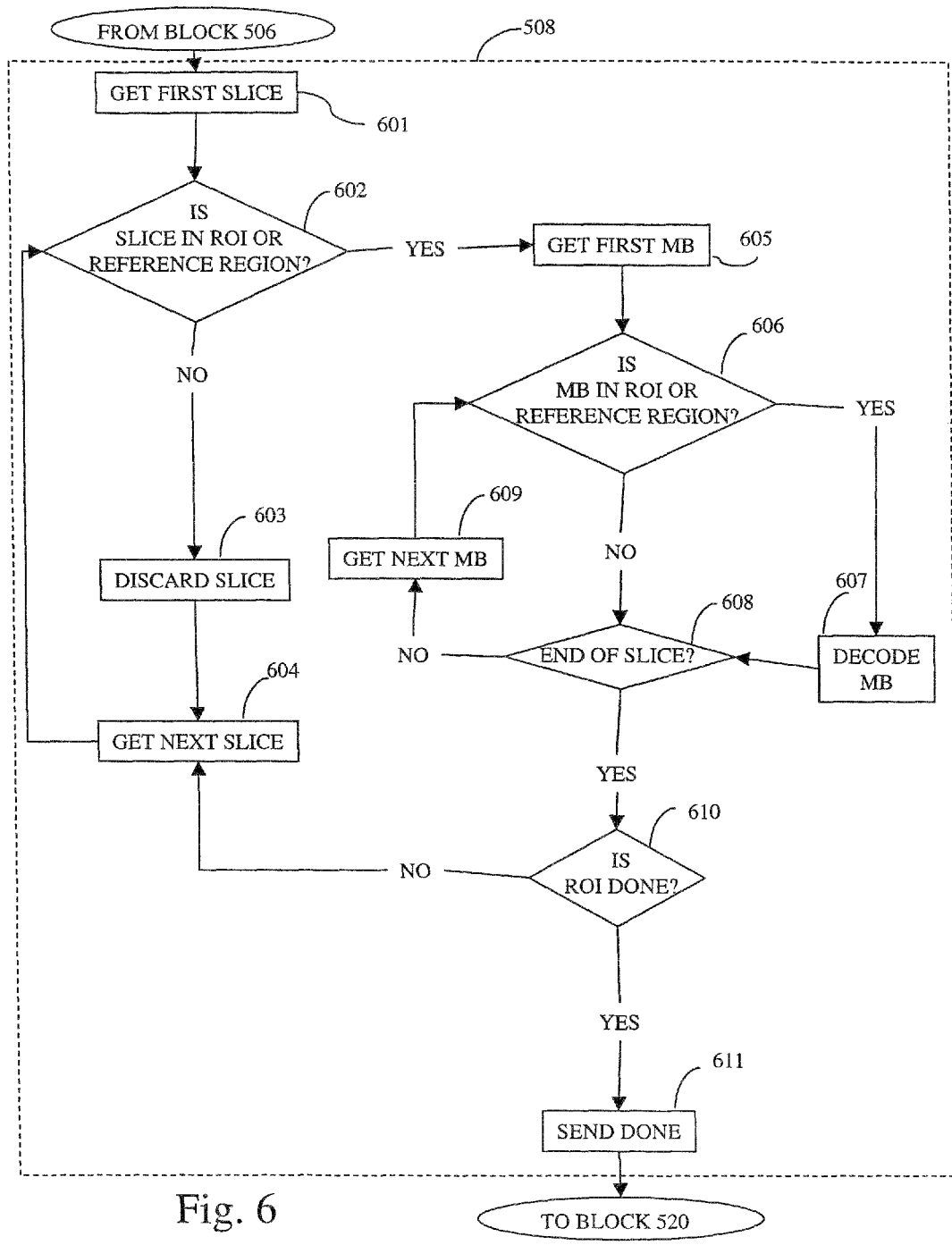
FIG. 6 is a flow chart of a node PC processing an I/P picture in the "push method" of manipulating MPEG video according to one embodiment of the invention.

FIG. 6 is a flow chart of a node PC processing an I/P picture in the "push method" of manipulating MPEG video according to one embodiment of the invention. The node gets the first slice of the picture at block 601. The server then determines if the slice is within the region of interest or a reference region in block 602. A reference region is an area surrounding an ROI. This area contains information relevant to the ROI. If at least part of the slice is not within the region of interest or its reference region, then the node discards the slice at block 603, gets the next slice of the picture at block 604, and control returns to block 602. If at least part of the slice is determined to be within the ROI or the ROI's reference region, then the node gets the first macroblock from the slice at block 605. The node then determines at block 606 whether the macroblock is within the region of interest or the reference region. If the macroblock is not within the region of interest or the reference region, then at block 608 the node determines if it has reached the end of the slice. If at block 608, it is determined that the node is not done with the slice, then at block 609 the node gets the next macroblock of the slice and control returns to 606. If at block 606 it is determined that the macroblock is within the region of interest or the reference region, then the node decodes the macroblock at block 607 and control passes to block 608. If at block 608, it is determined that the node is done with the slice, then at block 610, the node determines if it has completed decoding its region of interest. If the node has not completed its region of interest, then it proceeds to get the next slice of the picture at block 604. If the node has completed decoding its ROI, then at block 611, it sends a "done" signal to the client.

Figure 7:
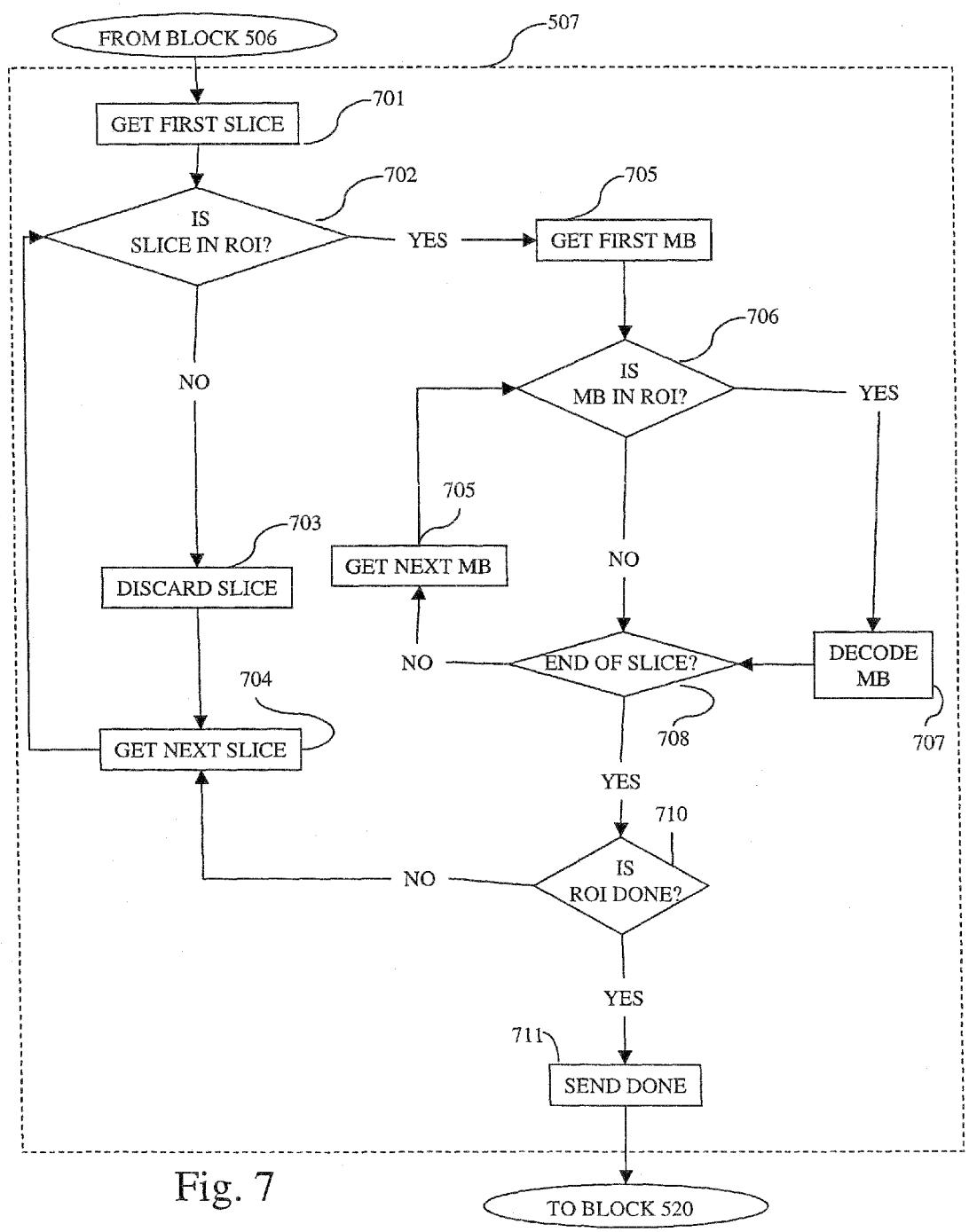
FIG. 7 is a flow chart of a node PC processing a B picture in the "push method" of manipulating MPEG video according to one embodiment of the invention.

FIG. 7 is a flow chart of a node PC processing a B picture in the "push method" of manipulating MPEG video according to one embodiment of the invention. The node gets the first slice of the picture at block 701. The server then determines if the slice is within the region of interest in block 702. If at least part of the slice is not within the region of interest, then the node discards the slice at block 703, gets the next slice of the picture at block 704, and control returns to block 702. If at least part of the slice is determined to be within the ROI, then the node decodes the first macroblock from the slice at block 705. The node then determines at block 706 whether the macroblock is within the region of interest. If the macroblock is not within the region of interest, then at block 708 the node determines if it has reached the end of the slice. If at block 708, it is determined that the node is not done with the slice, then at block 705 the node gets the next macroblock of the slice and control returns to 706. If at block 706 it is determined that the macroblock is within the region of interest, then the node decodes the macroblock at block 707 and control passes to block 708. If at block 708, it is determined that the node is done with the slice, then at block 710, the node determines if it has completed decoding its region of interest. If the node has not completed its ROI, then it proceeds to get the next slice of the picture at block 704. If the node has completed decoding its ROI, then at block 711, it sends a "done" signal to the client.

The "push method" enables parallel distributed MPEG display in a multiple system environment with software decoding. Since each node PC is only responsible for a defined region of each MPEG picture of the MPEG stream, the node PCs do not need to communicate with each other. The reduction in network traffic is accompanied by an evenly distributed workload and higher utilization of the node PCs. Each node will fully decode only its ROI. Once a node PC completes decoding a ROI, the PC can begin decoding the ROI for one or more subsequent pictures, whether or not the display signal has been received (of course, based on buffer memory availability). Furthermore, the "push method" does not require high-end graphics equipment. The client and nodes can be conventional PCs.

Figure 8:
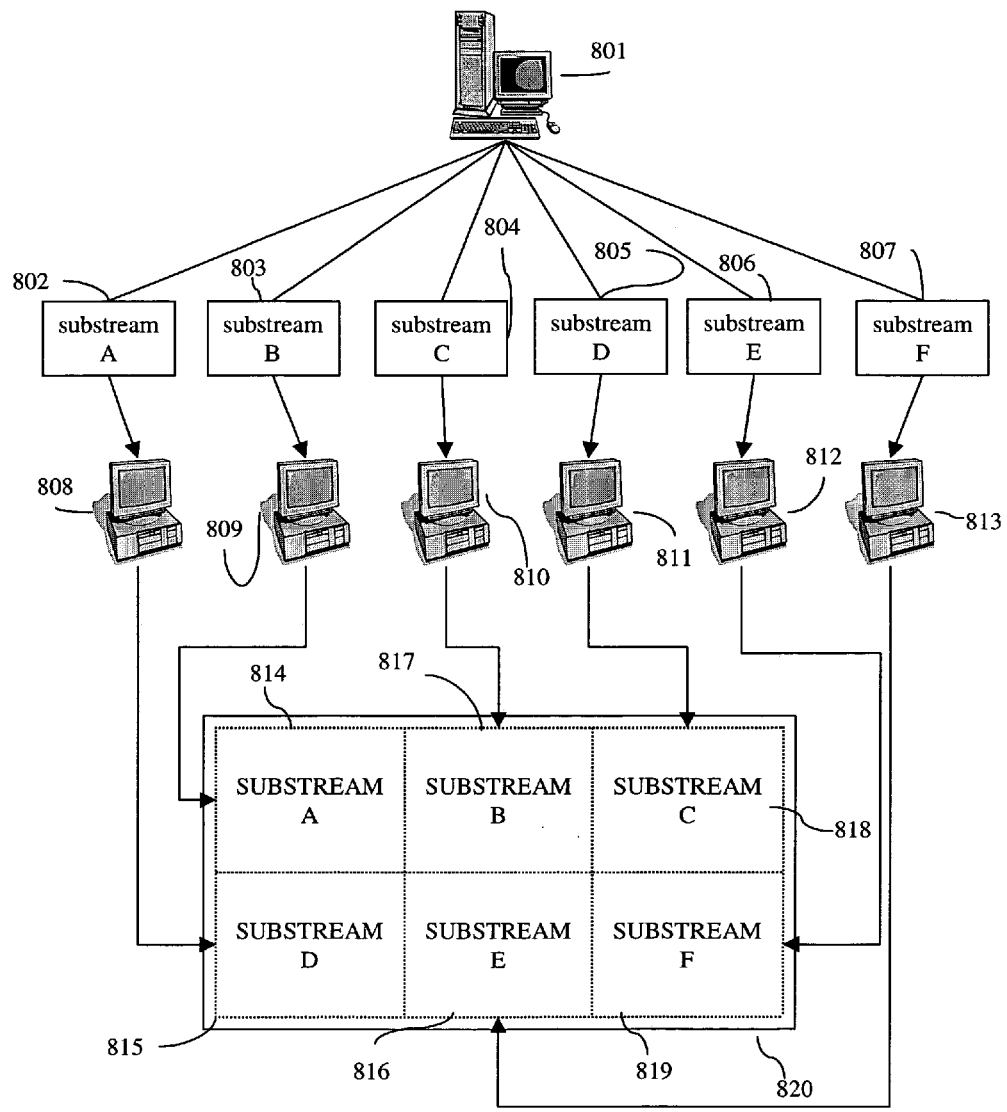
FIG. 8 is a conceptual diagram of the "pull method" of manipulating MPEG video, according to one embodiment of the invention.

According to another embodiment of the invention, a "pull method" of manipulating MPEG video is described. FIG. 8 is a conceptual diagram of the "pull method" of manipulating MPEG video, according to one embodiment of the invention. In the "pull method", a client computer 801 transmits multiple MPEG compliant substreams 802-807 over a network. Each substream 802-807 corresponds to a spatial location across the sequence of pictures comprising the MPEG stream. The spatial location is less than an entire picture. Each of the MPEG compliant encoded substreams 802 through 807 are transmitted to a specific node 808-813 connected to the network. Each node 808-813 decodes its substream 802-807 and displays the decoded substream 814-819. The client computer 801 can synchronize display of the decoded substreams 814-819 to display the MPEG stream 820. The MPEG compliant substreams 802-807 are created by the client computer at 801 from the MPEG stream 820. The client 801 may only create a single substream if only one ROI is desired.

This manipulation of an MPEG video stream to create a completely independent substream eliminates the problem of communication overhead between the nodes. In addition, an MPEG compliant substream corresponding to an ROI can provide a variety of new applications for MPEG video. A user may only be interested in one region of an MPEG video. A system could create a single substream focusing on that region from the MPEG video. This single substream can be scaled or manipulated further depending on the user's requirements. Some application may require manipulation of independent substreams from different MPEG streams. If desired, a single substream could be made which tracks a roaming ROI.

Figure 9:
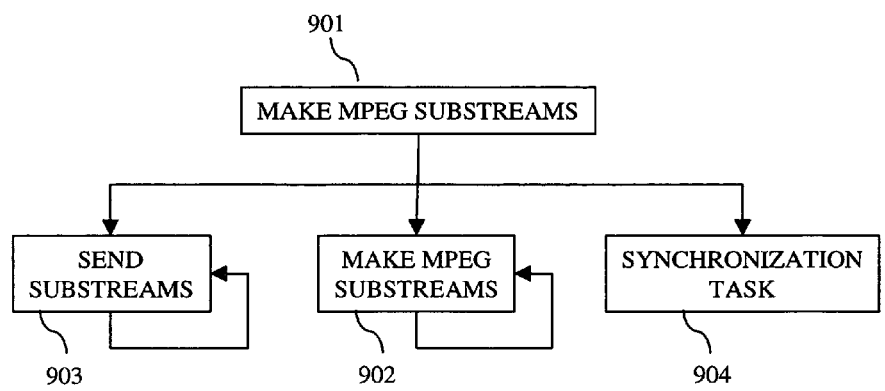
FIG. 9 is a flow chart of the client's tasks for the "pull method" of manipulating MPEG video according to one embodiment of the invention.

FIG. 9 is a flow chart of the client's tasks for the "pull method" of manipulating MPEG video according to one embodiment of the invention. At block 901, the client begins to make MPEG substreams from a main MPEG stream. While still making MPEG substreams in block 902, the client begins to send the substreams over a network at block 903. While sending the substreams and making additional substreams in with a lock-step approach, the client begins performing a synchronizing task at block 904.

Figure 10:
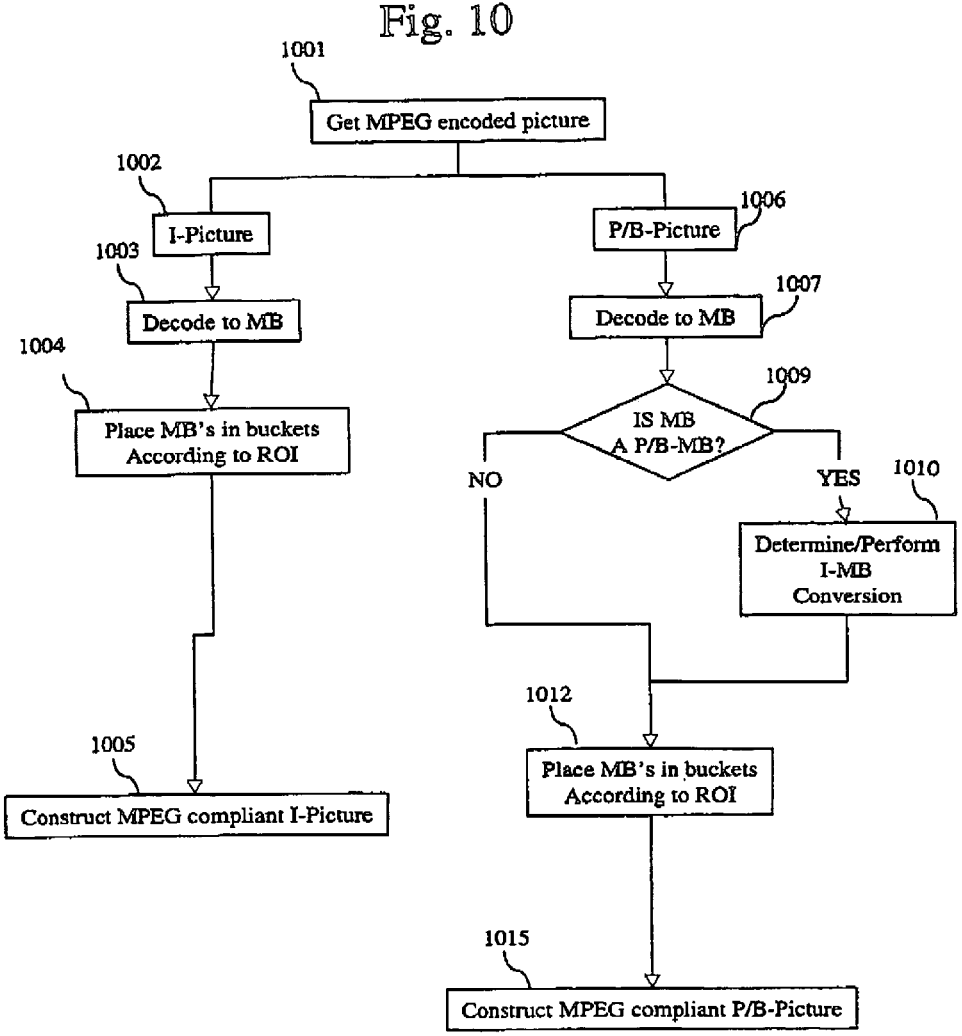
FIG. 10 is a flow chart of the client thread for the "pull method" of manipulating MPEG video according to one embodiment of the invention.

FIG. 10 is a flow chart of the client thread for the "pull method" of manipulating MPEG video according to one embodiment of the invention. At block 1001, the client gets an MPEG encoded picture from an MPEG stream. If at block 1002, the MPEG encoded picture is an I-picture, then the client decodes the I-picture at block 1003 to the macroblock level. At block 1004 the client separates the macroblocks into data structures according to one or more regions of interest. The client then uses the macroblocks in a data structure corresponding to one or more ROI's to construct a corresponding MPEG compliant I-picture at block 1005. According to one embodiment of the invention, new pictures are constructed slice by slice. For I-pictures, a new slice is constructed by putting together all the I-macroblocks within the ROI. The Q-value at the slice level needs to be updated by the Q-value used to code the first macroblock. In addition, the VLC code of the DC components for Y, Cr, and Cb of the first macroblock, require updates because they are coded losslessly by a DPCM technique. At each start of a slice, DC_DCT_PRED is reset and a new DC_DIFF value is calculated.

It is determined at block 1006 if the MPEG encoded picture is a P/B-picture. If the picture is a P/B-picture, then the client decodes the picture to the macroblock level at block 1007. It is determined at block 1009 if the MB is a P/B-MB. For those MBs that are P/B-MB, the client at block 1010 determines if each of the PB-macroblocks require conversion to an I-macroblock. One exemplary embodiment of block 1010 is later described in more detail with reference to FIG. 11. At block 1012, the client separates macroblocks into data structures according to one or more ROI's. At block 1015, the client then uses the MBs of each of the region(s) to construct an MPEG compliant P/B-picture. According to one embodiment of the invention, new pictures are constructed slice by slice. Like an I-picture, the Q-value of the first macroblock needs to be updated at a slice or macroblock level. If the first macroblock of the slice is an old I-macroblock, then the DC_DIFF values need an update just like an I-picture. However, if the first macroblock is a new I-macroblock and is followed by an I-macroblock, the DC_DIFF values of the following I-macroblock need to be updated. Similar to the DC_DCT_PRED, the MV is coded differentially with respect to previous decoded MV, and uses VLC. However, there are some differences. Forward MV and backward MV should be treated independently, because a B-MB can be decoded with forward MV and/or backward MV. A skipped MB has different effects on P- and B-pictures. In a P-picture, the PRED_MV is reset to zero when a MB is skipped. However, the PRED_MV are not affected in a B-picture.

Figure 11:
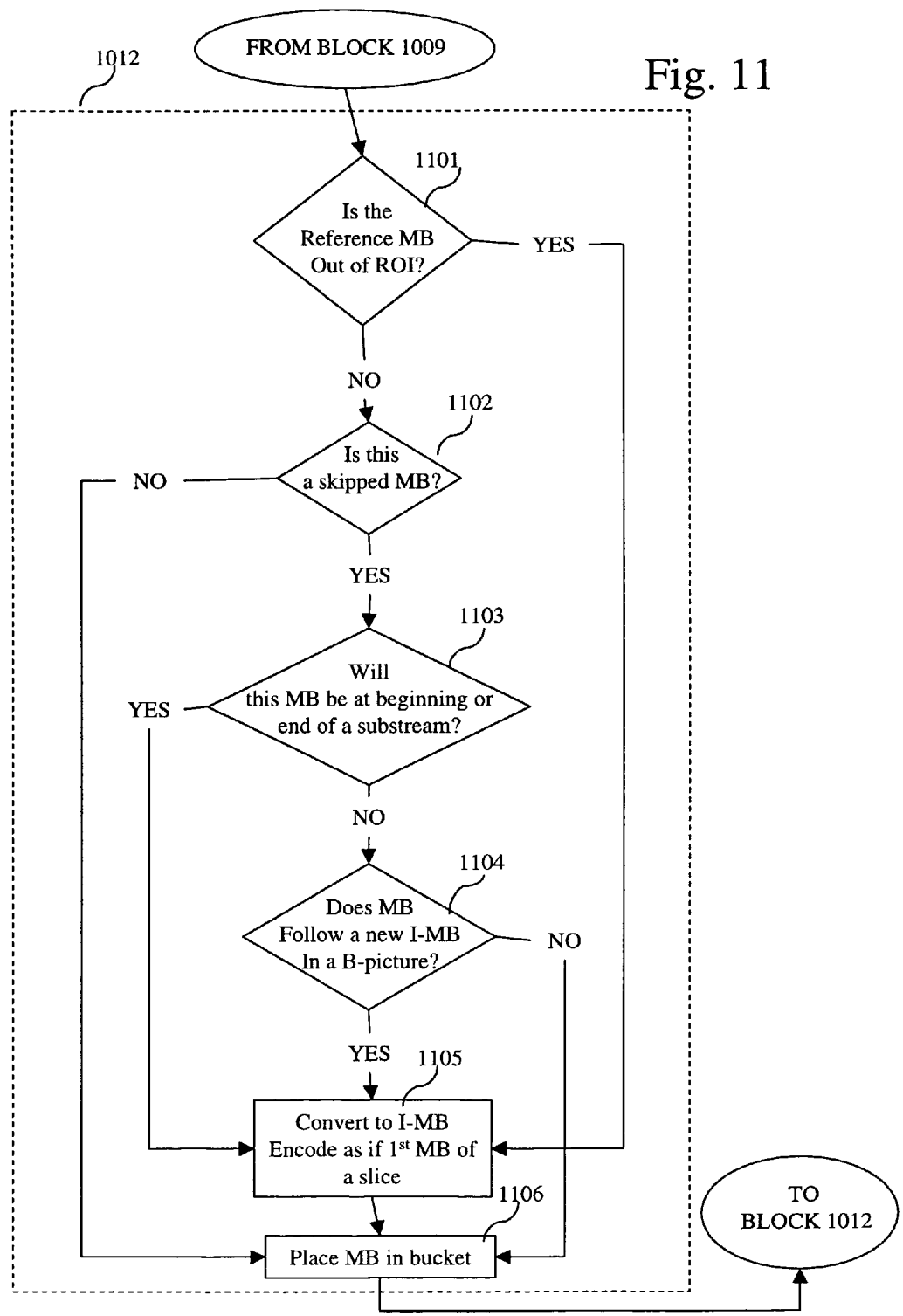
FIG. 11 is a flow chart for determining the conversion of a P/B-macroblock to an I-macroblock according to one embodiment of the invention.

FIG. 11 is a flow chart for determining whether the conversion of a PB-macroblock to an I-macroblock is required (block 1012), according to one embodiment of the invention. At block 1101 the client determines if a PB-macroblock's reference macroblock is out of the region of interest. A reference MB contains information needed by a MB, such as motion compensation information. If the reference macroblock is out of the region of interest, then the client converts the P/B-MB to an I-MB at block 1105. In one embodiment of the invention, a MB is converted to an I-MB by decoding the PB-MB to the pixel level and then encoding the pixels as MPEG compliant I-MBs. All MBs converted to I-MBs are encoded as if the first MB of a slice. If the PB-MBs reference MB is not beyond the ROI, then the client determines if the PB-macroblock is a skipped macroblock at block 1102. If the P/B-MB is not a skipped MB, then at block 1106 the client stores the P/B-MB into a data structure according to region of interest. If the P/B-MB is a skipped MB, then it is determined if the P/B-MB will be at the beginning or end of a new slice at block 1103. If the P/B-macroblock will be at the beginning or the end of a new slice, then the P/B-macroblock is converted to an I-MB at block 1105. If the P/B-macroblock will not occur at the beginning or end of a new slice, then it is determined if the skipped P/B-macroblock will follow a new I-macroblock in a B-picture in block 1104. If the skipped macroblock does not follow a new I-macroblock in a B-picture, then the client stores the P/B-macroblock in a data structure according to region of interest at block 1106. If the skipped P/B-macroblock does follow a new I-macroblock in a B-picture, then the client converts the skipped PB-macroblock to an I-macroblock at block 1105. Converted I-macroblocks are stored after conversion into one or more data structures according to region of interest at block 1106.

Like the "push method", the "pull method" also manipulates MPEG video enabling parallel distributed MPEG video display in a multiple system environment with software decoding. As in the "push method", the "pull method" doesn't require communication between the nodes. In addition, network traffic is further reduced because the client transmits substreams for one or more ROI's instead of the entire MPEG stream to each node. The nodes can use a conventional MPEG decoder since the substreams are MPEG complaint. More-over, the workload can be evenly balanced across the nodes because the nodes are only responsible for a substream representing their ROI.

The techniques shown in the figures can be implemented using code and data stored and executed on computers. Such computers store and communicate (internally and with other computers over a network) code and data using machine-readable media, such as magnetic disks; optical disks; random access memory; read only memory; flash memory devices; etc. Of course, one or more parts of the invention may be implemented using any combination of software, firmware, and/or hardware.

While the invention has been described in terms of several embodiments, those skilled in the art will recognize that the invention is not limited to the embodiments described. The MBs in the "pull method" can be stored in a variety of data structures, e.g., trees, tables, lists, hybrid trees, etc. The system may be set up to store MBs for newly constructed slices and immediately sending the slices. Another embodiment of the invention would utilize a data structure corresponding to ROI's and a buffer to store more than one constructed picture corresponding to an ROI before transmission. The method and apparatus of the invention can be practiced with modification and alteration within the spirit and scope of the appended claims. The description is thus to be regarded as illustrative instead of limiting on the invention.

What is claimed is:

1. A computer implemented method comprising:
  decoding a picture of an MPEG stream into a plurality of slices having a set of slices at least partially within an area of the picture, the area being less than all of the picture;
  decoding at least the set of slices but not the plurality of slices into a plurality of macroblocks having a set of macroblocks within the area; and
  decoding at least the set of macroblocks but not the plurality of macroblocks into pixels.

2. The method of claim 1 wherein the area is a region of interest.

3. The method of claim 1 further comprising displaying the decoded set of macroblocks.

4. A computer implemented method comprising:
  creating a first MPEG compliant substream from an MPEG stream including a plurality of pictures, the first substream corresponding to a first region of interest (ROI), said first ROI being an area of each picture of the plurality of pictures smaller than the total area of each picture;
  transmitting the first substream to a first recipient;
  creating a second MPEG compliant substream from the MPEG stream, the second substream corresponding to a second region of interest (ROI) that is different than the first ROI, said second ROI being an area of each picture of the plurality of pictures smaller than the total area of each picture; and
  transmitting the second substream to a second recipient that is different than the first recipient.

5. The method of claim 4 further comprising synchronizing display of the first substream with the second MPEG compliant substream from the MPEG stream.

6. The method of claim 4 wherein the creation and transmission of the first and second substreams are performed in a lock-step manner.

7. A computer implemented method comprising:
  decoding a picture from an MPEG stream;
  selecting a plurality of different Regions of Interest in the picture;
  constructing a plurality of different new MPEG pictures corresponding to the plurality of different regions of interest;
  transmitting the plurality of different new MPEG pictures to a corresponding plurality of different nodes; and
  commanding the plurality of different nodes to display the plurality of different new MPEG pictures.

8. A non-transitory machine-readable medium encoded with instructions, which when executed by a set of processors, cause said set of processors to perform operations comprising:
  decoding a picture of an MPEG stream into a plurality of slices having a set of slices at least partially within an area of the picture, the area being less than all of the picture;
  decoding at least the set of slices but not the plurality of slices into a plurality of macroblocks having a set of macroblocks within the area; and
  decoding at least the set of macroblocks but not the plurality of macroblocks into pixels.

9. The machine readable medium of claim 8 wherein the area is a region of interest.

10. The machine readable medium of claim 8 further comprising displaying the set of decoded macroblocks.

11. A non-transitory machine-readable medium that provides instructions, which when executed by a set of processors, cause said set of processors to perform operations comprising:
  creating a first MPEG compliant substream from an MPEG stream including a plurality of pictures, the first substream corresponding to a first region of interest (ROI), said first ROI being an area of each picture of the plurality of pictures smaller than the total area of each picture:
  transmitting the first substream to a first recipient;
  creating a second MPEG compliant substream from the MPEG stream, the second substream corresponding to a second region of interest (ROI) that is different than the first ROI, said second ROI being an area of each picture of the plurality of pictures smaller than the total area of each picture; and
  transmitting the second substream to a second recipient that is different than the first recipient.

12. The machine readable medium of claim 11 that provides instructions, which when executed by a set of processors, cause said set of processors to perform operations further comprising synchronizing display of the first substream with the second MPEG compliant substream from the MPEG stream.

13. The machine readable medium of claim 11 further comprising a lock-step mechanism governing the creation and transmission of the first and second substreams.

* * * * *